United States Patent
Smith et al.

(10) Patent No.: US 9,320,199 B2
(45) Date of Patent: Apr. 26, 2016

(54) MULTIPLE ROLLS NET WRAP ASSEMBLY

(75) Inventors: Kevin M. Smith, Narvon, PA (US);
Roger D. Mast, Jr., Ephrata, PA (US)

(73) Assignee: CNH Industrial America LLC, New Holland, PA (US)

( * ) Notice: Subject to any disclaimer, the term of this patent is extended or adjusted under 35 U.S.C. 154(b) by 927 days.

(21) Appl. No.: 13/301,909

(22) Filed: Nov. 22, 2011

(65) Prior Publication Data
US 2013/0125518 A1 May 23, 2013

(51) Int. Cl.
*B65B 11/00* (2006.01)
*A01F 15/07* (2006.01)

(52) U.S. Cl.
CPC ....... *A01F 15/0715* (2013.01); *A01F 2015/072* (2013.01); *Y10T 29/49826* (2015.01)

(58) Field of Classification Search
CPC ... A01F 15/07; A01F 15/071; A01F 15/0715; A01F 2015/072; Y10T 29/49823
USPC ............... 53/118, 587, 389.1–389.4, 397; 242/388.9, 388.91, 391, 396, 396.5, 242/396.6, 396.9; 141/111, 798.2, 141/798.4–798.5, 132
See application file for complete search history.

(56) References Cited

U.S. PATENT DOCUMENTS

| | | | |
|---|---|---|---|
| 3,214,113 A | | 10/1965 | Murray et al. |
| 4,677,807 A | * | 7/1987 | Verhulst et al. ............ 53/118 |
| 4,838,016 A | | 6/1989 | Frogbrook et al. |
| 5,231,828 A | | 8/1993 | Swearingen et al. |
| 5,974,764 A | * | 11/1999 | Anstey et al. ............ 53/118 |
| 5,996,307 A | | 12/1999 | Niemerg et al. |
| 6,247,291 B1 | | 6/2001 | Underhill |
| 6,272,816 B1 | | 8/2001 | Viaud et al. |
| 6,823,646 B2 | | 11/2004 | McClure et al. |
| 7,278,251 B2 | | 10/2007 | Paillet et al. |
| 7,334,382 B2 | | 2/2008 | Smith |
| 7,478,517 B2 | | 1/2009 | Paillet et al. |
| 7,644,559 B2 | | 1/2010 | Smith |
| 7,716,903 B2 | | 5/2010 | McClure et al. |
| 8,919,085 B2 | | 12/2014 | Smith et al. |
| 2007/0074488 A1 | * | 4/2007 | Smith ............ 53/430 |

(Continued)

FOREIGN PATENT DOCUMENTS

| | | |
|---|---|---|
| DE | 9211541.1 | 12/1992 |
| DE | 10004564 A1 | 8/2001 |
| EP | 1080628 A1 | 3/2001 |

(Continued)

OTHER PUBLICATIONS

EP1602270 A1 (machine translation) 7 pages, retrieved on Jan. 25, 2015.*

*Primary Examiner* — Andrew M Tecco
*Assistant Examiner* — Praachi M Pathak
(74) *Attorney, Agent, or Firm* — Patrick M. Sheldrake

(57) ABSTRACT

A baler which includes a net wrapper assembly and method of using the improved baler to install net rolls into a net wrapping assembly in the baler. The net wrapping assembly includes first and second net support tubes for holding respective first and second net rolls. The first and second net support tubes include pivoting elements for pivoting the net support tubes away from wrapping active positions. The net wrapping assembly also includes a support arm for supporting the weight of the net rolls during installation. The net wrapping assembly also includes brake systems, which are connected to a net feeding system, for applying and releasing tension to the net roll.

16 Claims, 12 Drawing Sheets

(56) References Cited

U.S. PATENT DOCUMENTS

2007/0084146 A1* 4/2007 McClure et al. ............... 53/430
2010/0192516 A1* 8/2010 Olander .......................... 53/399

FOREIGN PATENT DOCUMENTS

| EP | 1602270 A1 | 12/2005 |
| FR | 2845562 A1 | 4/2004 |

* cited by examiner

1102 — Pivoting a first net support tube away from the net wrapper assembly at a first net support tube pivoting element.

1104 — Placing a first net roll onto the first net support tube.

1106 — Pivoting the first net support tube and the first net roll back toward the net wrapper assembly and into a first net roll wrapping active position.

1108 — Pivoting a second net support tube away from the net wrapper assembly at a second net support tube pivoting element.

1110 — Placing a second net roll onto the second net support tube.

1112 — Pivoting the second net support tube and the second net roll back toward the net wrapper assembly and into a second net roll wrapping active position.

FIG. 11

MULTIPLE ROLLS NET WRAP ASSEMBLY

TECHNOLOGY FIELD

The present disclosure relates generally to a net roll support for installation and storage of net rolls in a baler, and particularly to multiple net support tubes in a net wrapper assembly which hold net rolls and pivot between net roll wrapping active positions and net roll installation positions.

BACKGROUND

For many years agricultural balers have been used to consolidate and package crop material so as to facilitate the storage and handling of the crop material for later use. Usually, a mower-conditioner cuts and conditions the crop material for windrow drying in the sun. When the cut crop material is properly dried, a baler, for example a round baler, the most frequently used in industry, travels along the windrows to pick up the crop material and form it into cylindrically-shaped round bales.

More specifically, the cut crop material is gathered at the front of the baler from along the ground, onto a pickup assembly, and introduced into a bale-forming chamber within the baler. Inside the cut crop is rolled up into a predetermined size. A conventional bale chamber may include a pair of opposing sidewalls with a series of belts, chains, and/or rolls that rotate and compress the crop material into the cylindrically-shaped round bale. When the predetermined size is achieved, the cylindrically-shaped round bale is wrapped and bound by either net wrapping, plastic wrapping, and/or wire. After the round bale is wrapped, the back of the baler, or tailgate, opens and the wrapped bale is discharged.

Net wrapping, here after referring to net and plastic wrapping, is fed into the baler off a net roll and into a net wrapper assembly, conventionally located in the front of the baler. As the baler forms, bounds, and distributes the bale, netting is depleted until the net roll needs to be replaced by a spare net roll. Typically, one or two spare net rolls are stored on the baler, usually housed at the rear of the baler at the tailgate. When a net roll needs to be replaced, the operator discards the depleted net roll, walks to the back of the baler to acquire a stored net roll, then walks the stored net roll to the front of the baler, and installs the new net roll. Net roll length typically measures 122 to 130 centimeters (48 to 51 inches) in length and between 30 and 45 kilograms (70 and 100 pounds) in weight. The size and weight of the net rolls impose for awkward transport from the rear and awkward installation at the front of the baler. The operator is tasked to lift the net roll to a net supporting tube and slide the net roll onto the tube. The supporting tube can be 4 to 5 feet off the ground. Additionally, once on the tube, the net roll needs to be threaded into the net wrapper assembly and the net roll is then pushed into the operating position. Thus, it is desirable to minimize operator effort to replace a net roll in a baler. Relatedly, it is also desirable to improve storage capability of net rolls on round balers.

What is needed is improved storage and a process for net roll installation into the net wrapper assembly that minimizes manual operator effort to install spare net rolls into an active net roll position in the assembly, minimizes time of total manual operator involvement when replacing and installing a net roll, and thus effectively improves the capability of the baler.

SUMMARY

Embodiments of the present invention provide a new and improved process for installation of net rolls into the net wrapper assembly. The invention provides a net roll support for installation and storage of multiple net rolls.

Embodiments of the present invention are directed to a baler that includes a net wrapper assembly. The baler also includes a first net support tube configured for holding a first net roll. The first net support tube includes a first end connected to the net wrapper assembly at a first net support tube pivoting element on the net wrapper assembly and a second end connected to the net wrapper assembly when the first net roll is in a first wrapping active position within the net wrapper assembly. The baler further includes a second net support tube configured for holding a second net roll. The second net support tube includes a first end connected to the net wrapper assembly at a second net support tube pivoting element on the net wrapper assembly and a second end connected to the net wrapper assembly when the second net roll is in a second wrapping active position within the net wrapper assembly.

According to one embodiment of the invention, the baler further includes a support arm that supports the weight of the first and second net rolls during installation of the net rolls onto their respective net support tubes. The support arm includes a top surface where the first and second net rolls lie during installation of the net rolls onto their respective net support tubes and a first end coupled to the net wrapper assembly. The first end has a support arm rotating element configured to rotate the support arm between a first support arm position when at least one of the first and second net rolls are in their respective wrapping active positions and a second support arm position during installation of the first and second net rolls onto their respective net support tubes.

According to one embodiment of the invention, at least one of the first and second net support tube pivoting elements are configured to pivot a respective net support tube away from its first wrapping active position. According to an aspect of one embodiment of the invention, at least one of the first and second net support tube pivoting elements are configured to pivot a respective net support tube horizontally and vertically away from its first wrapping active position. According to another aspect of one embodiment of the invention, at least one of the first and second net support tube pivoting elements are configured to pivot a respective net support tube away from its first wrapping active position at an angle in the range of about 30 degrees to about 60 degrees.

According to one embodiment of the invention, the baler further includes a plurality of brake systems. Each brake system is configured to apply and release tension to a respective one of the first and second net rolls. According to an aspect of one embodiment, each brake system includes a brake drum connected to a respective net roll, a brake pad in proximity to the brake drum, and a movable brake arm coupled to the brake drum or the brake pad. The movable brake arm is configured to cause the brake pad to move toward the brake drum and away from the brake drum to apply and release the tension to the respective one of the first and second net rolls or cause the brake drum to move toward the brake pad and away from the brake pad to apply and release the tension to the respective one of the first and second net rolls.

According to one embodiment of the invention, the baler further includes a feeding mechanism that feeds net from one of the respective first and second net rolls, a movable feeding arm connected to the feeding mechanism, and a plurality of movable link arms. Each movable link arm is connected to the movable feeding arm and a respective brake system and each movable link arm is configured to cause at least one of the respective brake systems to apply the tension and release the tension to a respective net roll.

According to an aspect of one embodiment, the movable feeding arm is configured to be at a first position prior to net from one of the net rolls being placed on a bale, and each brake system releases the tension to each respective net roll when the movable feeding arm is in the first position. The movable feeding arm is configured to be at a second position when net from one of the net rolls is wrapping around a bale, and each of the movable brake pads engages each of the movable drums and applies the tension when the movable feeding arm is in the second position. According to another aspect of one embodiment, the feeding mechanism is configured to receive the first and second nets from each of the first and second net rolls at a common point in the feeding mechanism.

Embodiments of the present invention are also directed to a net wrapper assembly. The net wrapper assembly includes a first net support tube configured for holding a first net roll. The first net support tube includes a first end connected to the net wrapper assembly at a first net support tube pivoting element on the net wrapper assembly, and a second end connected to the net wrapper assembly when the first net roll is in a first wrapping active position within the net wrapper assembly. The net wrapper assembly also includes a second net support tube configured for holding a second net roll. The second net support tube includes a first end connected to the net wrapper assembly at a second net support tube pivoting element on the net wrapper assembly, and a second end connected to the net wrapper assembly when the second net roll is in a second wrapping active position within the net wrapper assembly. The net wrapper assembly further includes a support arm that supports the weight of the first and second net rolls during installation of the net rolls onto their respective net support tubes. The support arm includes a top surface where the first and second net rolls lie during installation of the net rolls onto their respective net support tubes and a first end coupled to the net wrapper assembly. The first end of the support arm includes a support arm moving element configured to move the support arm between a first support arm position when at least one of the first and second net rolls are in their respective wrapping active positions and a second support arm position during installation of the first and second net rolls onto their respective net support tubes.

According to one embodiment of the invention, the net wrapper assembly further includes a support arm guide bar positioned below the second net support tube and substantially parallel to the second net support tube. The support arm moving element includes at least one of a rotating element configured to rotate the support arm and a sliding element configured to slide the support arm in a direction substantially parallel to and along the support arm guide bar.

According to an aspect of one embodiment, the second net support tube is positioned below the first net support tube, the support arm is positioned below the second net support tube and extends in a direction away from the first and second net support tubes during installation of the second net roll. At least one of the first and second net support tube pivoting elements are configured to pivot a respective net support tube away from its first wrapping active position such that a portion of respective net roll lies on the support arm during installation of the respective net roll.

According to one embodiment of the invention, the net wrapper assembly further includes a plurality of brake systems. Each brake system includes a brake drum connected to a respective net roll, a brake pad in proximity to the brake drum and a movable brake arm coupled to the brake drum or the brake pad. The movable brake arm is configured to cause the brake pad to move toward the brake drum and away from the brake drum to apply and release the tension to the respective one of the first and second net rolls or cause the brake drum to move toward the brake pad and away from the brake pad to apply and release the tension to the respective one of the first and second net rolls.

According to another embodiment of the invention, the net wrapper assembly of further includes a feeding mechanism that feeds net from one of the respective first and second net rolls, a movable feeding arm connected to the feeding mechanism and a plurality of movable link arms. Each movable link arm is connected to the movable feeding arm. Each brake system and each movable link arm is configured to cause a respective brake system to apply the tension and release the tension to a respective net roll.

According to an aspect of one embodiment, the movable feeding arm is configured to be at a first position when one of the net rolls is fed through the feeding mechanism, and each brake system applies the tension to each respective net roll when the movable feeding arm is in the first position. The movable feeding arm is configured to be at a second position when the net support tubes are in a fixed position, and each brake system disengages the tension to each respective net roll when the movable feeding arm is in the second position. According to an aspect of one embodiment, the feeding mechanism is configured to receive the first and second nets from each of the first and second net rolls at a common point in the feeding mechanism.

Embodiments of the present invention are directed to methods for installing first and second net rolls into a net wrapper assembly for activation. In one embodiment, the method includes pivoting a first net support tube away from the net wrapper assembly at a first net support tube pivoting element and placing a first net roll onto the first net support tube. The method also includes pivoting the first net support tube and the first net roll back toward the net wrapper assembly and into a first net roll wrapping active position and pivoting a second net support tube away from the net wrapper assembly at a second net support tube pivoting element. The method further includes placing a second net roll onto the second net support tube and pivoting the second net support tube and the second net roll back toward the net wrapper assembly and into a second net roll wrapping active position.

According to another aspect of the invention, the method further includes moving a support arm between a first support arm position and a second support arm position. The support arm is in a first support arm position when at least one of the first and second net rolls are in their respective wrapping active positions and the support arm is in the second support arm position during placing of one of the first and second net rolls onto their respective net support tubes. The step of placing a first net roll onto the first net support tube includes supporting the weight of the first net support tube with the support arm, and the step of placing a second net roll onto the second net support tube includes supporting the weight of the second net support tube with the support arm.

According to an aspect of one embodiment, the step of moving a support arm between a first support arm position and a second support arm position includes at least one of rotating the support arm and sliding the support arm in a direction substantially parallel to and along a support arm guide bar. The support arm guide bar is positioned below the second net support tube and substantially parallel to the second net support tube.

According to another aspect of one embodiment, the second net support tube is positioned vertically below the first net support tube. The support arm is positioned vertically below the second net support tube while the support arm is in the second support arm position. The step of pivoting a first net support tube away from the net wrapper assembly includes pivoting the first net support tube horizontally away from the net wrapper assembly and vertically toward the support arm while the support arm is in the second support arm position.

According to another aspect of one embodiment, the method further includes feeding net from one of the respective first and second net rolls to a common point in the net wrapper assembly and feeding net from the other net roll of the respective first and second net rolls to the common point in the net wrapper assembly.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures:

FIG. 11 is a flow chart illustrating an exemplary method of installing net rolls in accordance with an embodiment of the invention.

DETAILED DESCRIPTION OF ILLUSTRATIVE EMBODIMENTS

The problems in the prior art have motivated the creation of a net wrapper assembly for improved net wrapper installation in a baler and processes to minimize manual operator effort when installing net rolls into the baler for activation. In some embodiments, improved net roll storage on the baler is also provided.

Figure 1:
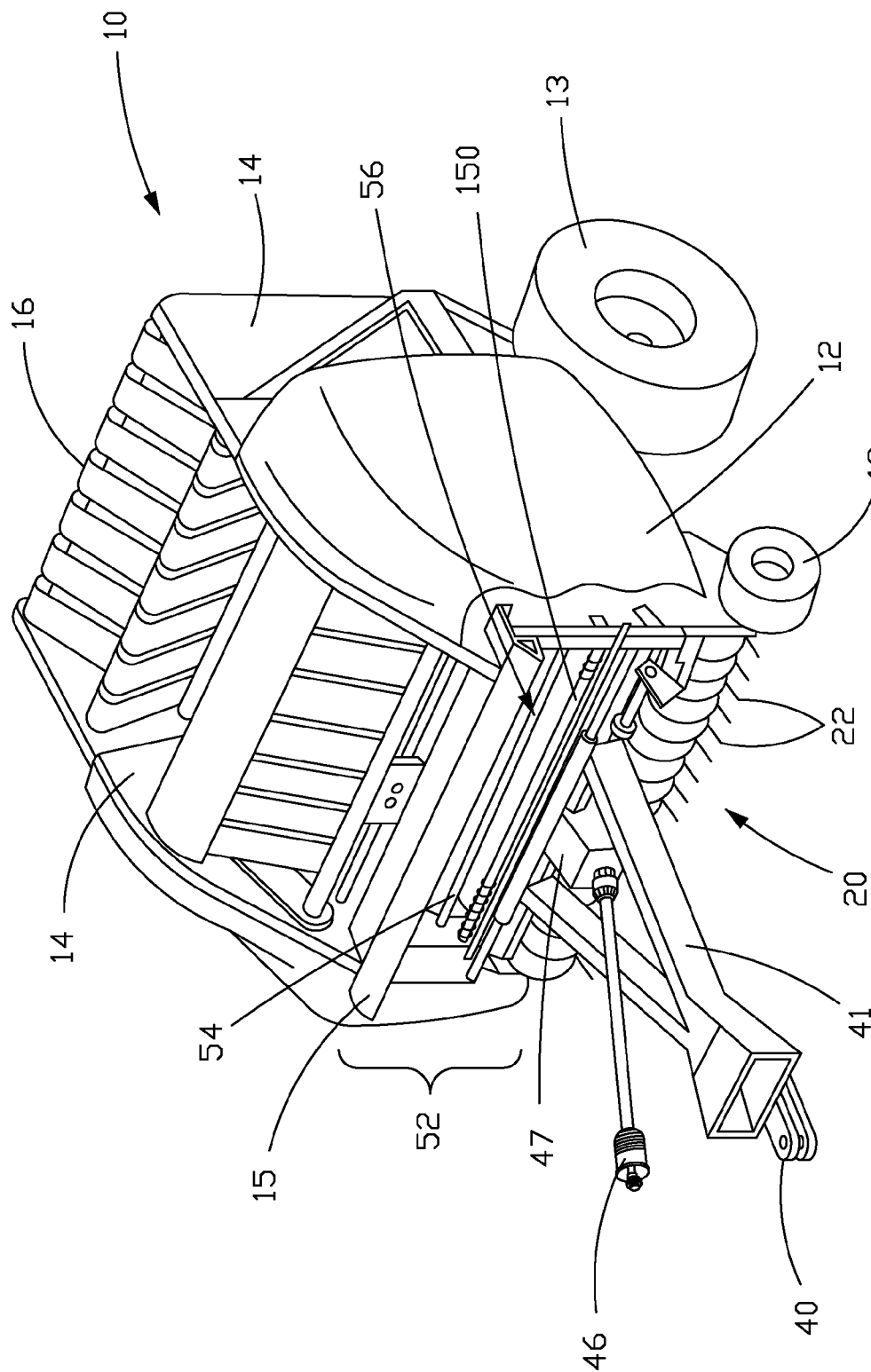
FIG. 1 illustrates an exemplary round baler.

FIG. 1 illustrates an exemplary round baler. As shown in FIG. 1, round baler 10 is enclosed by a main frame 12, comprising a plurality of rigid structural elements including a pair of side walls 14. Main frame 12 is supported by a pair of rear wheels 13. A forwardly mounted hitch 40, integrated with the main frame 12, provides for connection to a tractor, for example. As shown, a power take off (PTO) shaft 46, is located herein above the hitch 40. In other balers, the PTO shaft may be located and connected to the tractor below the hitch. The PTO shaft draws energy from a tractor driving the hitch and transfers that energy to drive mechanisms in the baler 10. Rear side 16, typically comprises a tailgate which is closed during baling and opened to eject finished bales. In conventional balers, storage to house spare net rolls is typically located about the tailgate.

Also shown in FIG. 1 is the front side 15 of the baler. This side faces the rear of a tractor as connected to by the hitch 40 and PTO shaft 46. At the bottom of the front side, between a front pair of wheels 13a, and mounted to the mainframe 12, is the pickup 20. The pickup 20 is supported by the pair of front wheels 13a. Pickup tines 22 wrap around and connect within the pickup 20. The tips of the tines 22 are movable along a predetermined path along the ground to lift crop material from the ground and deliver it rearward along a generally horizontal path toward a floor roll (not shown) at the bottom of the baler, which is rotatably mounted on main frame 12. During baling, the floor roll conveys crop material further rear into a bale chamber where belts then urge the material upwardly and forwardly into engagement with sledge rolls. The sledge rolls coil crop material in a round direction to form and add to a bale core. Continued feeding by pickup tines 22 urge additional crop material into the forming bale in a generally spiral fashion growing the bale core.

FIG. 1 shows a net wrapper assembly 52 above the pickup 20, hitch mount 41, and PTO shaft mount 47. In this exemplary baler, the net wrapper assembly 52 comprises an active roll cavity 54. When the baler is in use, the active roll cavity 54 would house a net roll which would spin around a net support tube 150 as netting is fed into a net feeding entry 56.

Figure 2:
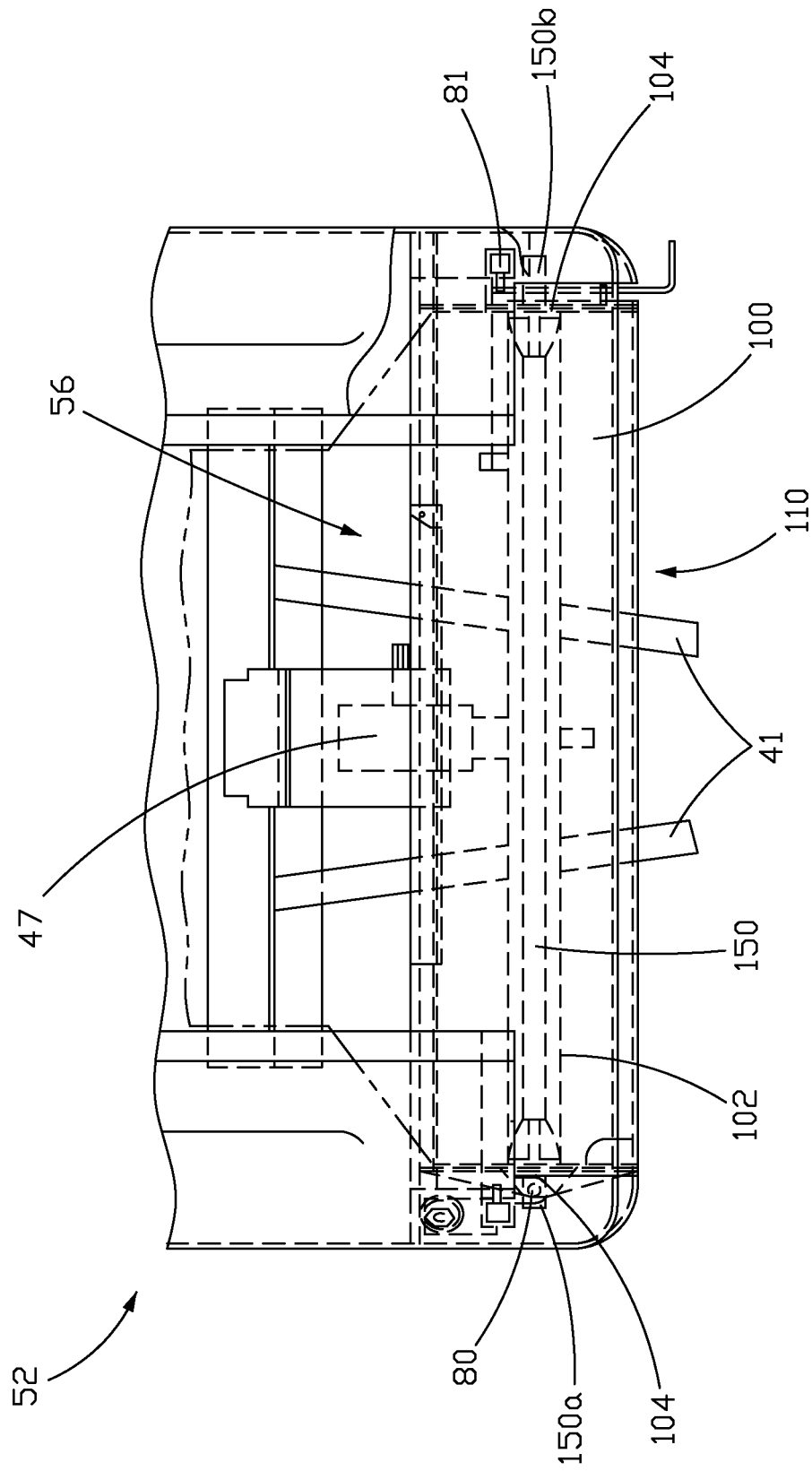
FIG. 2 illustrates a top view of an exemplary net wrapper assembly with a net roll in active position.

FIG. 2 shows a top view of the net wrapper assembly 52 from FIG. 1. This particular net wrapper assembly 52 comprises a net roll 100 for netting a bale of crop material in the baler 10 when in an active net roll position 110. After a cylindrical package of crop material has been formed in the baler, it is wrapped with wrapping from the net wrapper assembly 52 utilizing either plastic or netting to encompass the package and form the round bale.

A net roll, as shown in FIG. 2, is cylindrical comprising two net roll openings 104 on each of the flat ends of the cylinder. The roll is typically either approximately 122 cm (48 inches) or 130 cm (51 inches) in length. The diameter of a net roll, prior to any netting being extracted from the net roll and then administered through the net wrapper assembly 52 is approximately 31 centimeters (12 inches) in diameter. The roll comprises a net roll shaft passageway 102, extending from between each opening 104 in the net roll. The diameter of the net roll shaft passageway 102 is typically 9 centimeters (3.5 inches), and the passageway 102 is typically centered radially from the outer circumference of the net roll 100. In the active net roll position 110, a single, one-piece, or continuous net support tube 150 extends through the net roll shaft passageway 102 connected within the net wrapper assembly 52. A first end 150a of the net support tube 150 connects in the net wrapper assembly 52 at a pivot connection 80 and a second end 150b of the net support tube 150 connects in the net wrapper assembly 52 at an arm lock connection 81.

Figure 3:
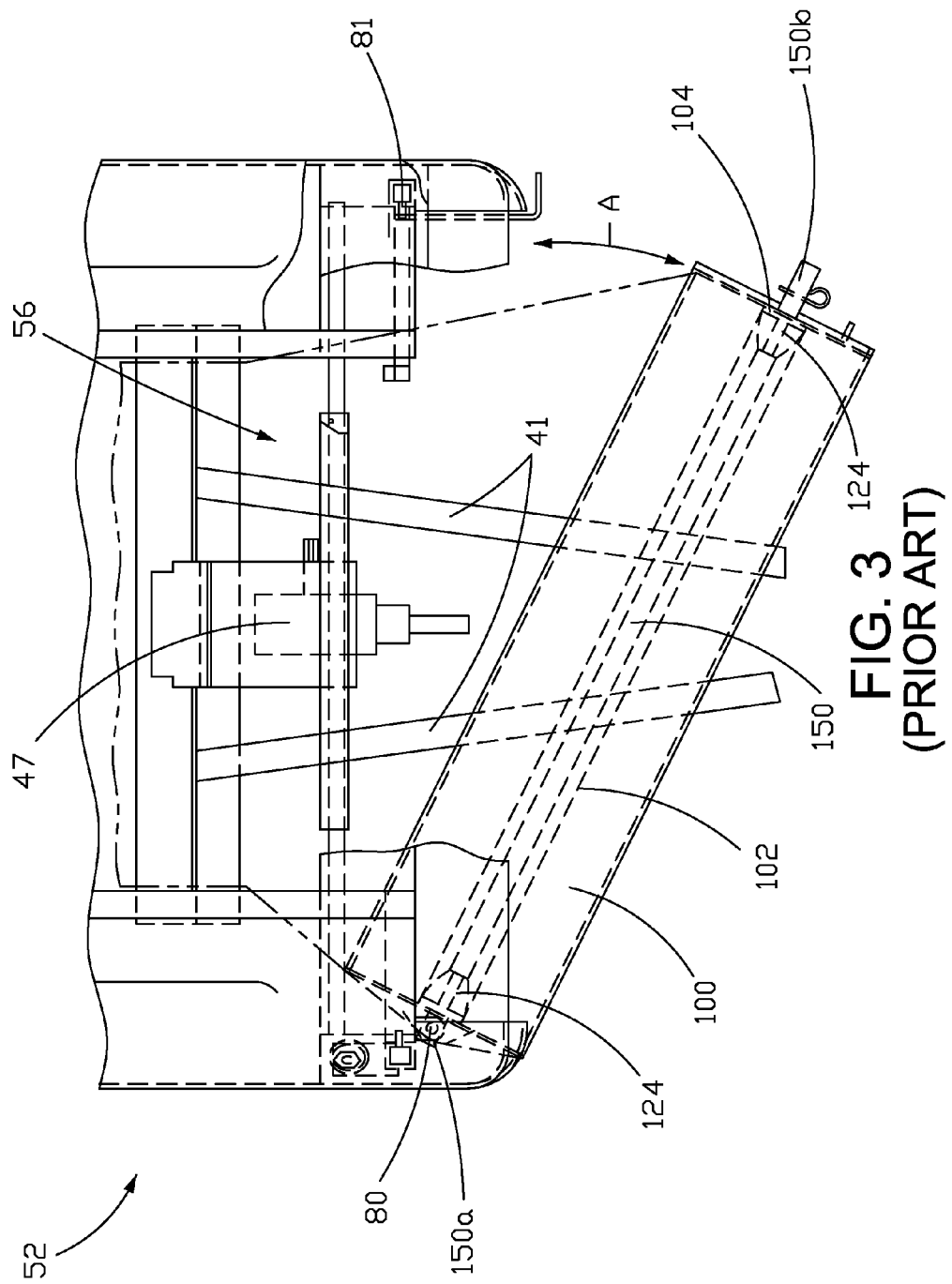
FIG. 3 illustrates a top view of an exemplary net wrapper assembly with net roll in a non-active position.

FIG. 3 shows the net wrapper assembly 52 in FIG. 2 with the net roll 100 swung along path A out from the active net roll position 110. From this position, FIG. 3 shows the second end 150b of the net support tube 150 exposed as extending outside of the net roll opening 104. Bearings 124, connected to the support tube, are located near both ends of the net support tube 150. The bearings are typically conical in structure and fitted into the net roll opening such that the base of the cone faces connection with the net wrapper assembly. The bearings are capable of sliding along the length of the support tube to support various cylinder length net rolls. With the net roll installed on the net support tube, as seen in FIG. 3, the bearing 124 is enclosed on the net roll opening 104 such that the cone fills volume between the net roll shaft passageway 102 and net support tube 150. The base of the cone is nearly flush with ends of the net roll 100.

When the net roll is in the active net roll position, as shown in FIG. 2, the process of wrapping the bale may begin. In active position, netting is extended continuously from the net roll into the net feeding entry 56 and introduced onto the surface of the bale. As the wrapping enters the feeding entry, it is spun from the surface of a spinning net roll. The net roll 100 is spun in conjunction with the spinning of the bearings 124 installed through the net roll openings 104 on each end of the net roll 100. The single net support tube 150, located within the net roll shaft passageway 102, does not spin during the wrapping process.

Figure 4:
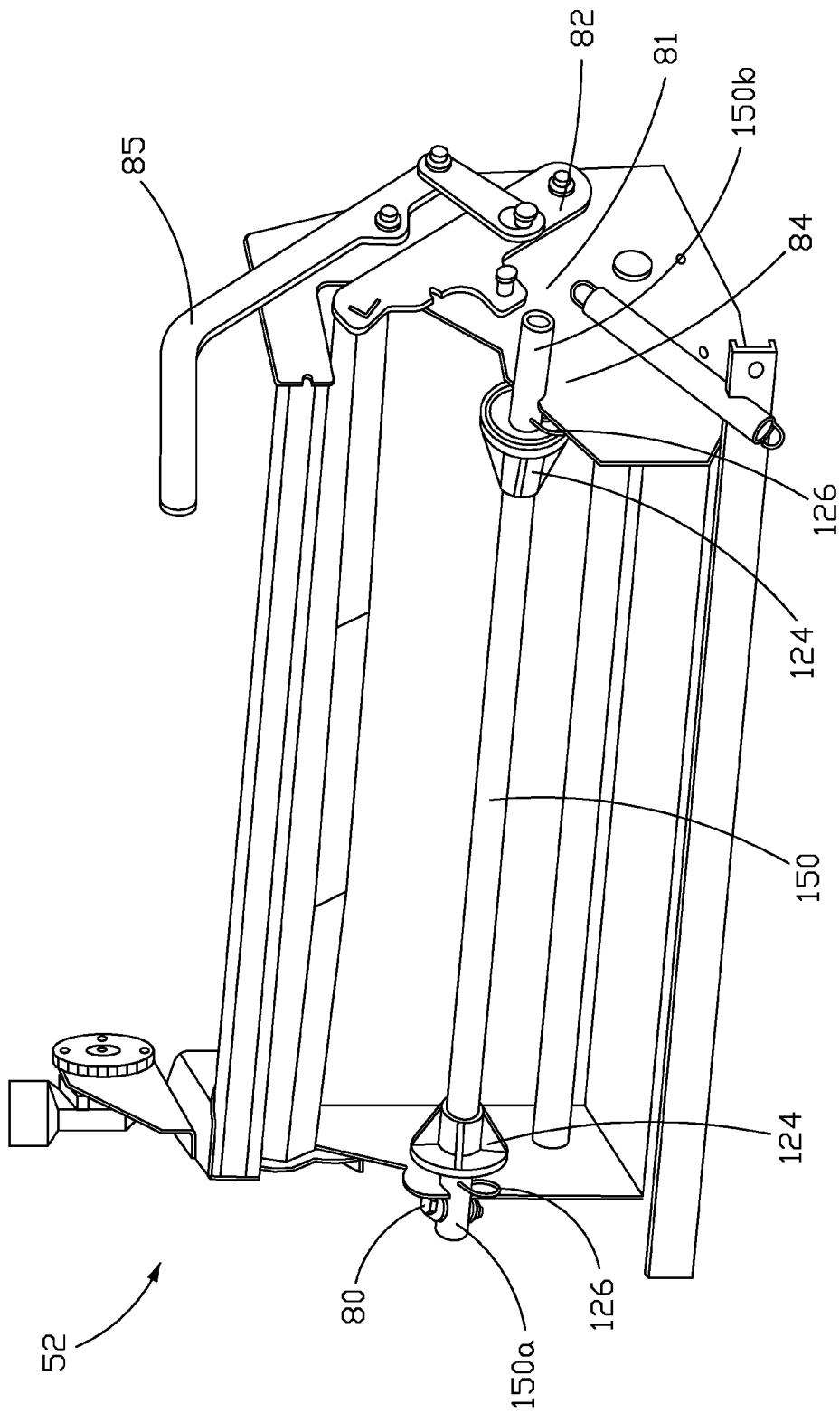
FIG. 4 illustrates a front facing view of an exemplary net wrapper assembly without a net roll.

FIG. 4 shows an exemplary front facing view of the net support tube 150 in the net wrapper assembly 52, without an installed net roll. The single net support tube 150 is capable of rotation towards and away from the net wrapper assembly 52 by pivot connection 80 for the conventional installation of a net roll 100 not shown in FIG. 4. The first end 150a of the net support tube 150 is connected to the pivot connection 80 which typically includes a pivot bolt. Bearings 124 are shown with one conical shape base facing the pivot connection 80 and the other facing the arm lock connection 81. On some support tubes, guides 126 are placed along the cone base of the bearing, so that the bearing is forced flush against the guide when the bearing is installed into the opening of a net roll. Some support tubes contain holes running linearly from the end of the support tube to the center. These often serve as connections points to place the guide 126 either closer or further from support tube 150 center to enclose various sized (e.g. length) net rolls.

In many net wrapper assemblies, and as discussed with respect to FIG. 3, the net support tube 150 can be rotated from the pivot connection 80 and back. To rotate the net support tube 150 out and away from the assembly, an operator pulls down on handle 85 to lift arm 82 off of the net roll at arm lock connection 81, as shown in FIG. 4. Arm 82 in the down position provides down force on the second end 150b of the single net support tube 150 to contain the support tube in u-shaped groove 84. When the net roll is in the active position, the net support tube is locked and limited from movement with arm 82 on top the net roll.

Removal of a depleted net roll from the active position in the assembly 52, requires an operator to pull down on handle 85 to lift arm 82 off of the net roll, then lift the net support tube 150 up and out from u-shape groove 84. The operator swings the net support tube and empty net roll away from the net wrapper assembly from pivot connection 80 to a distance where the operator may remove the net roll clear of the assembly. The operator then removes the guide 126 and slides the bearing 124 off the end of the net support tube 150 at second end 150b. The empty net roll is then slid off from second end 150b.

An operator installs a new net roll in reverse order. An operator lifts a new net roll onto the net support tube and pushes the net roll along the tube until the tube is flush against the bearing 124 near the pivot connection 80. Any removed guide and bearing is reinserted onto the tube and pushed flush against the net roll. The net support tube 150 is lifted and placed into the u-shape groove 84 and the swing handle 85 is lowered onto the end of the net support tube 150.

In the removal and installation of net roll, as described above, an operator is required to exert unnecessary time and energy. The operator is already burdened by having to pick up a new net roll from storage, typically located at the back of the baler. Net rolls located in proximity to the tailgate are susceptible to damage as the tailgate is repeatedly opened and closed to eject bails. The operator then must walk the new net roll, weighing approximately 45 kilograms (100 pounds), to the net wrapper assembly. With the net support tube extended away from the assembly, and bearing and guides removed, the operator then must lift the heavy roll up to meet the tube. Due to the awkwardness of holding up a heavy roll, often measuring 122 to 130 centimeters (48 to 51 inches) in length, the operator is challenged to place the net support tube into the net roll opening 104 of the net roll. Once the net support tube is inserted, the operator must continuously hold up the net roll as it is pushed down the support tube and flush against the bearing at the pivot connection. The operator will pull net wrapping from the roll for insertion in the net feeding entry 56. The operator also is tasked to take time to remove a bearing and guide at every net removal and replace a bearing and guide at every new net roll installation.

Embodiments of the present invention limit the exerted manual labor required of an operator to retrieve and install a new net roll into the net wrapper assembly when the active net roll expires as well as limiting net roll exposure from damage near the tailgate by implementing first and second net support tubes in active wrapping positions into the net wrapper assembly. Embodiments of the invention also provide a support arm located below the net support rolls to aid an operator with installation of a new net roll. In other embodiments of the invention, the net wrapper assembly stores spare net rolls in active wrapping positions to limit net roll exposure from damage near the tailgate. In other embodiments of the invention, the net wrapper assembly stores spare net rolls in active wrapping positions to eliminate the transfer of a net roll from the rear of a baler to the front of the baler.

FIGS. 5 through 11 illustrate various exemplary embodiments of the invention. The net wrappers shown in FIGS. 5 through 10 are at the front of a baler, between the baler and the tractor.

Figure 5:
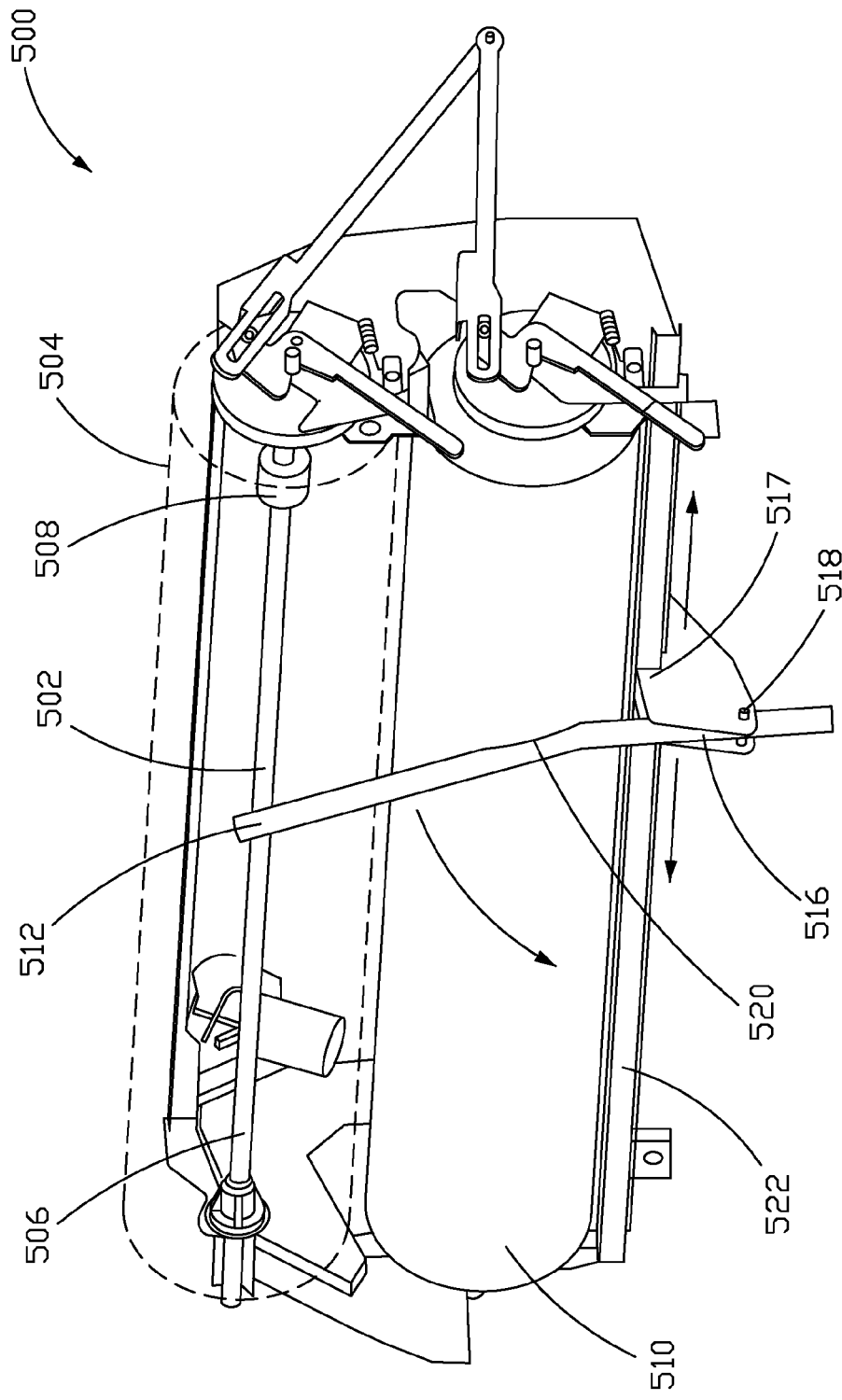
FIG. 5 illustrates an exemplary embodiment of the invention showing a net wrapper assembly with two net rolls.

FIG. 5 illustrates an exemplary embodiment of the invention showing a net wrapper assembly with two net rolls. FIG. 5 shows net rolls 504, 510 in their respective wrapping active positions. A net roll is in its wrapping active position when it is in a position to have net fed from the roll to a net feeding system for wrapping the net on a bale. As shown, the net wrapper assembly 500 includes a first net support tube 502 configured for holding a first net roll 504. Exemplary net support tubes may be constructed of steel, brass, composite, plastic, or any other material to support the weight of a net roll. Net roll 504 is shown in transparency. First net support tube 502 includes a first end 506 connected to the net wrapper assembly at a first net support tube pivoting element (806 at FIG. 8) on the net wrapper assembly 500, and a second end 508 connected to the net wrapper assembly 500 when the first net roll 504 is in a first wrapping active position within the net wrapper assembly 500.

As shown at FIG. 5, net wrapper assembly 500 also includes a second net roll 510. Although not shown in FIG. 5, second net roll 510 also includes a net support tube having the same or similar structure as first net support tube 502. Accordingly, net support tube 502 includes a first end connected to the net wrapper assembly 500 at a second net support tube pivoting element (808 at FIG. 8) on the net wrapper assembly and a second end connected to the net wrapper assembly 500 when the second net roll 510 is in a second wrapping active position within the net wrapper assembly 500.

According to an exemplary embodiment, a net wrapper assembly also includes a support arm for supporting the weight of net rolls during installation. For example, as shown at FIG. 5, net wrapper assembly 500 also includes a support arm 512 that supports the weight of the first net roll 504 and second net roll 510 during installation of the net rolls 504, 510 onto their respective net support tubes. Exemplary support arms may be constructed of steel, brass, composite, plastic, or any other material to support the weight of a net roll and its respective net support tube.

Figure 9A:
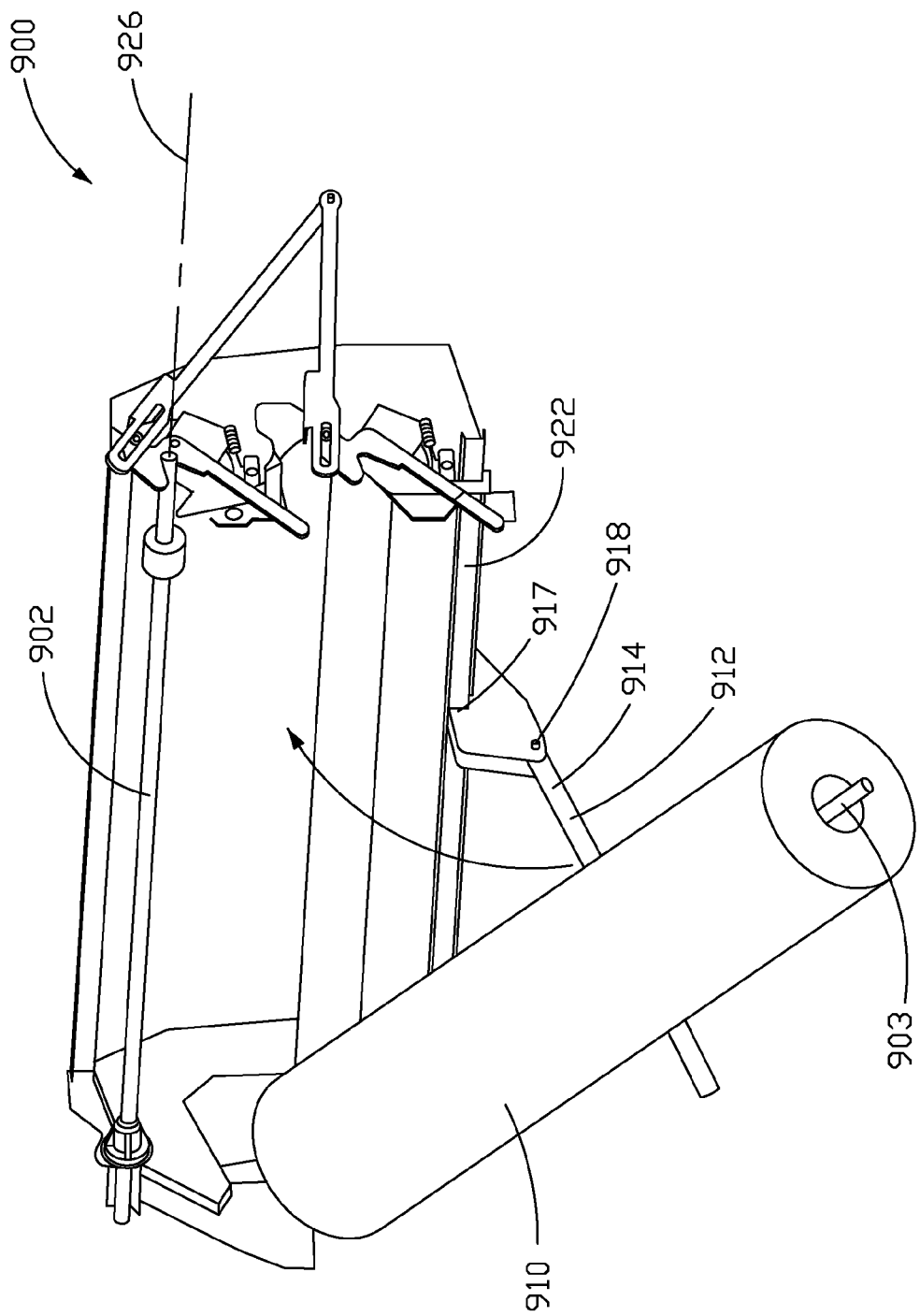
FIG. 9A illustrates an exemplary embodiment of the invention showing a net wrapper assembly at one stage during installation of net rolls.
Figure 9B:
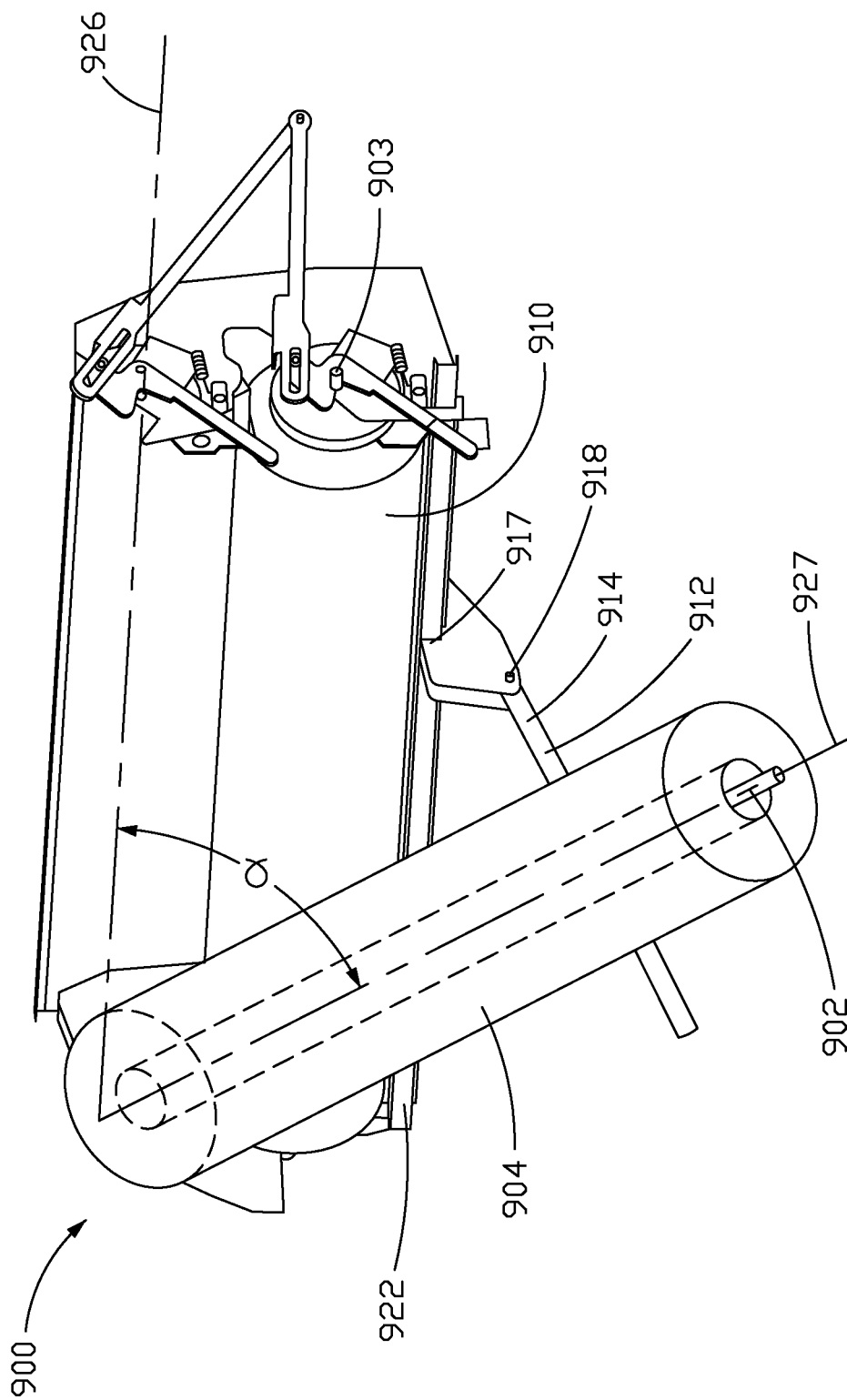
FIG. 9B illustrate an exemplary embodiment of the invention showing a net wrapper assembly at another stage during installation of net rolls.

According to an exemplary embodiment, a support arm may include a support arm moving element configured to move the support arm between a position when net rolls are in wrapping active positions and another position during installation of the net rolls. As shown at FIG. 5, support arm 512 includes a first end 516 coupled to the net wrapper assembly 500. The first end 516 of the support arm 512 includes support arm moving elements, 517 and 518 configured to move the support arm between a first support arm position and a second support arm position. A support arm may be in a first support arm position when at least one of the first and second net rolls is in its respective wrapping active position. For example, as shown at FIG. 5, the support arm 512 is in a first support arm position while the first and second net rolls 504, 510 are in their respective wrapping active positions. A support arm may be in a second support arm position when one of the first and second net support tubes is in an installation position. One of the first and second net support tubes are in an installation position when they are in a position to have a respective net roll installed. For example, FIG. 9A shows the support arm 912 in a second support arm position during installation of the second net roll 910 onto second net support tube 903. FIG. 9B shows the support arm 912 in a second support arm position during installation of the first net roll 904 onto first net support tube 902.

According to one exemplary embodiment, a support arm moving element may include a rotating element. Exemplary rotating elements are shown as 518 at FIG. 5 and 918 at FIGS. 9A and 9B. A support arm moving element may also include a sliding element. Exemplary sliding elements are shown as 517 at FIG. 5 and 917 at FIGS. 9A and 9B. Exemplary sliding elements may include linear bearings (not shown) or other hardware to slide a support arm along a support arm slide bar.

According to one exemplary embodiment, a net wrapper assembly may include a support arm guide bar. Exemplary support arm guide bars are shown as 522 at FIG. 5 and 922 at FIGS. 9A and 9B. As shown at FIG. 5, support arm guide bar 522 is positioned below and substantially parallel to the second net support tube (not shown at FIG. 5, but essentially having the same structure as first net support tube 502) within second net roll 510.

As shown at FIG. 5, a support arm rotating element 518, 918 may be used to rotate the support arm 512, 912 between the first support arm position (shown at FIG. 5) and the second support arm position (shown at FIGS. 9A and 9B). The curved arrows at FIG. 5 and FIG. 9A show approximate directions of the rotating movement of the support arm 512, 912. Further, as shown at FIG. 5, a support arm sliding element 517, 917 may be used to slide the support arm 512, 912 in a direction substantially parallel to and along the support arm guide bar 522, 922, as shown by the straight arrows at FIG. 5.

The net wrapper assembly 900 at FIGS. 9A and 9B illustrate an exemplary embodiment of the invention showing net rolls 904 and 910 during different stages of installation. As shown at FIGS. 9A and 9B, support arm 912 is at a second support arm position during installation of the first and second net rolls 904, 910 onto their respective net support tubes 902, 903. According to one exemplary embodiment, net support tubes and support arms may move independently of each other. Accordingly, it is contemplated that exemplary support arms may be in a first support arm position when net rolls are not in their respective wrapping active positions. For example, an operator may choose not to use a net support arm and the net support arm may be moved into a first support arm position (as shown at FIG. 5) while the operator is installing a net roll onto a net support tube.

Figure 6:
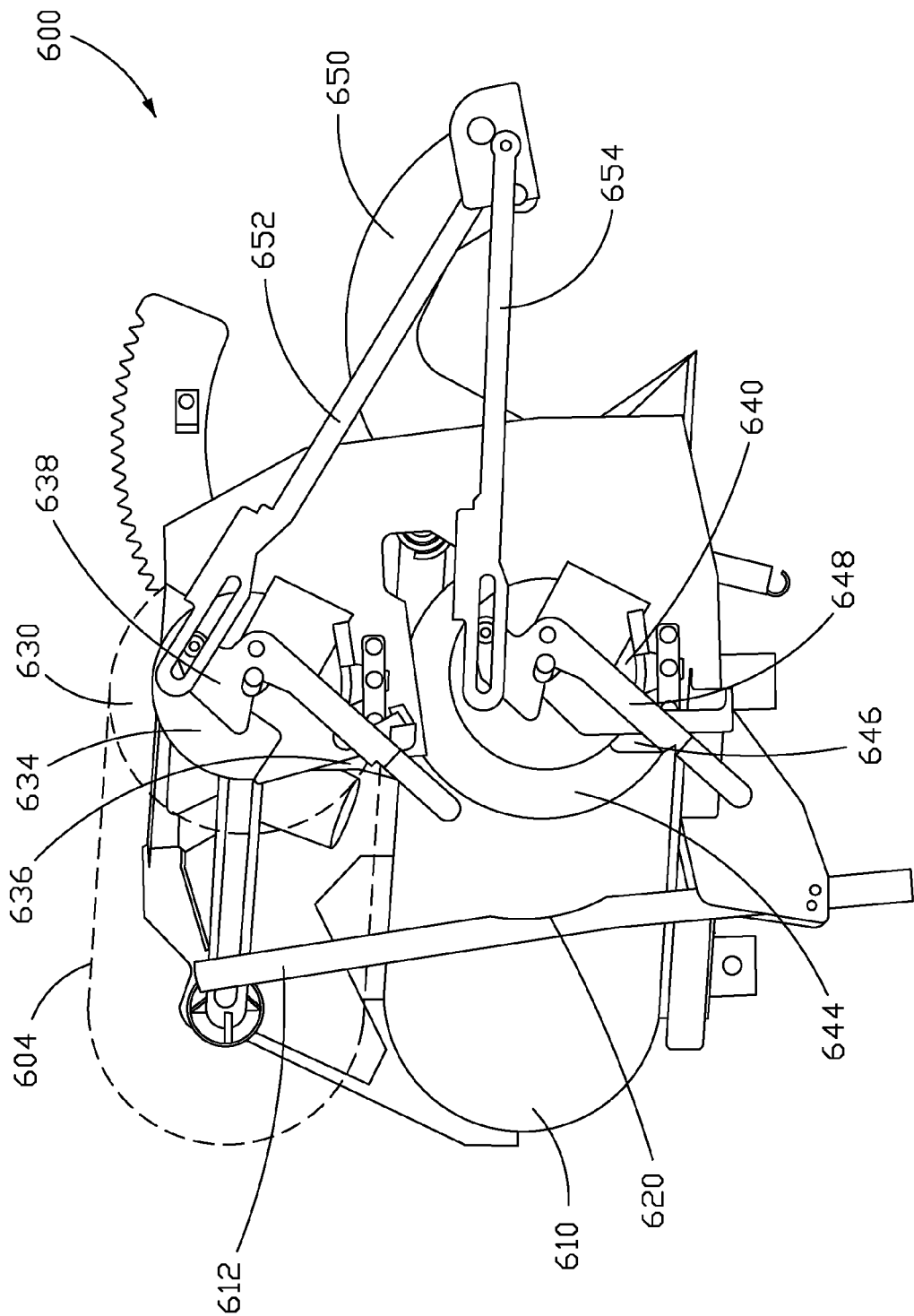
FIG. 6 illustrates an exemplary embodiment of the invention showing a net wrapper assembly with two net rolls and braking systems.
Figure 7:
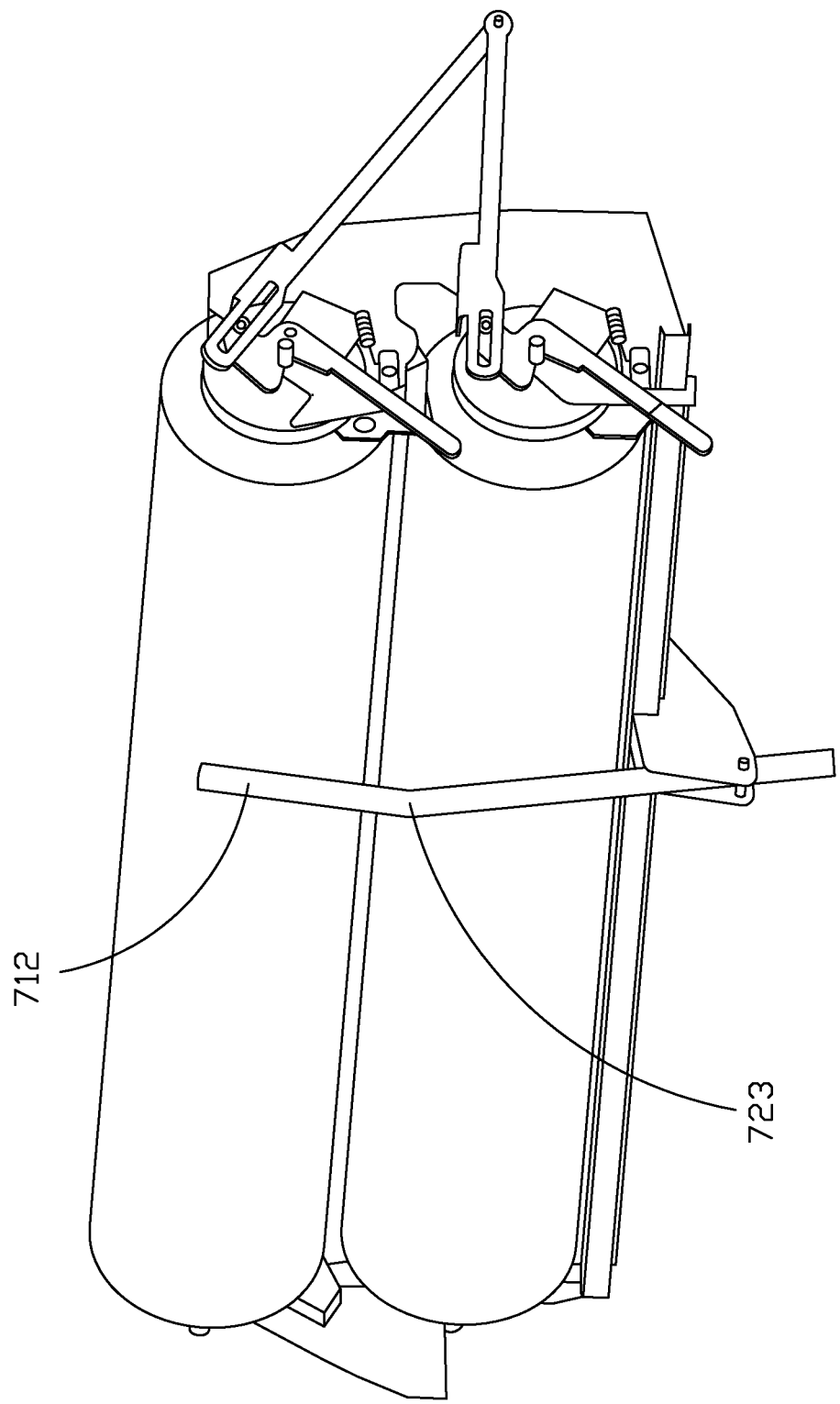
FIG. 7 illustrates an exemplary embodiment of the invention showing a net wrapper assembly with two net rolls and a curved support arm.

As shown at FIGS. 9A and 9B, support arm 912 includes a top surface 914 where the first net roll 904 and second net roll 910 lie during installation of the net rolls onto their respective net support tubes. In some embodiments, the support arm may include a cavity for supporting an exemplary net roll. For example, as shown at FIGS. 5 and 6, exemplary support arms 512 and 612 each include a respective cavity 520 and 620 along portions of their surfaces. In some embodiments, the support arm may be curved. For example, as shown at FIGS. 7 and 8, exemplary support arms 712 and 812 are curved at points 723 and 823 along their surfaces.

One net support tube may be positioned lower than the other net support tube. Further, a support arm may be positioned below the first and second net support tubes so that the higher net support tube may be lowered down to the support arm. For example, as shown in FIGS. 9A and 9B, second net support tube 903 is positioned below first net support tube 902 and support arm 912 is positioned below both net support tubes 902 and 903. This may ease the burden of the operator during installation of the higher net roll because the operator does not have to reach as high to place the net roll on the net support tube.

Figure 8:
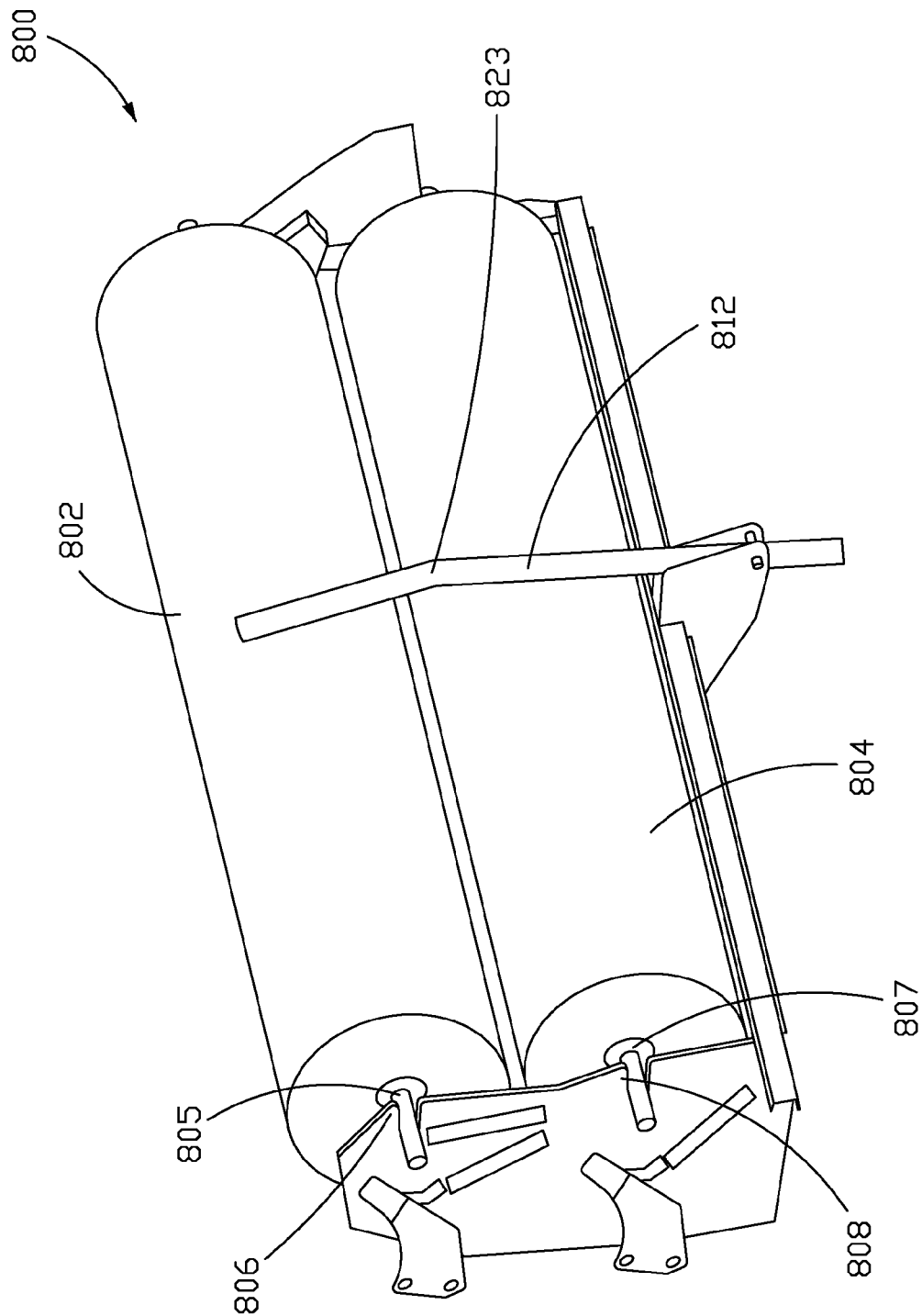
FIG. 8 illustrates an exemplary embodiment of the invention showing a net wrapper assembly with two net rolls having net roll support tube pivoting elements.

FIG. 8 illustrates an exemplary embodiment of the invention showing net support tube pivoting elements on the net support tubes. As shown at FIG. 8, wrapper assembly 800 includes a first net roll 802 and a second net roll 804 in wrapping active positions. As shown in FIG. 8, net wrapper assembly 800 includes a first net support tube 805 holding first net roll 802 and a second net support tube 807 holding second net roll 804. First net support tube 805 includes a first end connected to the net wrapper assembly 800 at a first net support tube pivoting element 806 on the net wrapper assembly 800. Second net support tube 807 includes a first end connected to the net wrapper assembly 800 at a second net support tube pivoting element 808 on the net wrapper assembly 800.

For example, referring back to FIG. 9A, an exemplary second net support tube pivoting element (such as pivoting element 808) may be configured to pivot a second net support tube (bottom support tube) 910 away from the first wrapping active position such that a portion of the second net roll 910 lies on support arm 912 during installation of the second net roll 910. Referring back to FIG. 9B, an exemplary first net support tube pivoting element (such as pivoting element 806) may be configured to pivot the first net support tube 904 away from the first wrapping active position such that a portion of the first net roll 904 lies on support arm 912 during installation of the first net roll 904.

According to one embodiment, a net support tube pivoting element may be configured to pivot a net support tube away from its wrapping active position center axis at a desirable angle. As shown at FIG. 9A, first net support tube 902 in its wrapping active position. As described above, a net roll is in its wrapping active position when it is in a position to have net fed from the roll to a net feeding system for wrapping the net on a bale. First net support tube 902 includes a wrapping active position center axis 926 while in its wrapping active position. As shown at FIG. 9B, first net support tube 902 in its installation position. As described above, one of the first and second net support tubes are in an installation position when they are in a position to have a respective net roll installed. First net support tube 902 includes an installation position center axis 927 while in its installation position. As shown at FIG. 9B, net support tube pivoting element (such as pivoting element 806) may be configured to pivot net support tube 902 away from its wrapping active position center axis to its installation position center axis 927 at an angle α.

According to another embodiment, a net support tube pivoting element may be configured to pivot a net support tube both horizontally and vertically away from its wrapping active position center axis at a desirable angle. It may be preferable to pivot a net support tube away at an angle of about 45 degrees. It is contemplated, however, that an angle in the range of about 30 degrees to about 60 degrees may be preferred. It is also contemplated that an angle greater than 60 degrees or less than 30 degrees may be used.

According to another embodiment, a net wrapper assembly may include a plurality of brake systems configured to apply and release tension to the net rolls. According to one exemplary embodiment, a brake system may be optionally configured to apply tension on a respective net roll in the range of about 50 to 100 pounds.

As shown at FIG. 6, net wrapper assembly 600 includes brake systems 630 and 640. Each brake system is configured to apply and release tension to a respective one of the first and second net rolls 604 and 610. Brake system 630 is configured to apply and release tension to first net roll 604. Brake system 640 is configured to apply and release tension to second net roll 610.

Each brake system may include a brake drum connected to a respective net roll, a brake pad in proximity to the brake drum, and a movable brake arm coupled to at least one of the brake drum and the brake pad. In one embodiment, a movable brake arm may be coupled to a brake pad, and the movable brake arm may be configured to cause the brake pad to move toward and away from a brake drum to apply and release the tension to a respective net roll. For example, as shown at FIG. 6, brake system 630 includes brake drum 634 connected to net roll 604, brake pad 636 in proximity to brake drum 634 and movable brake arm 638 coupled to movable brake pad 636. Movable brake arm 638, as shown, is configured to cause brake pad 636 to move toward brake drum 634 and away from the brake drum 634 to apply and release the tension to first net roll 604. Brake system 640 includes brake drum 644 connected to net roll 610, brake pad 646 in proximity to the brake drum 644 and movable brake arm 648 coupled to movable brake pad 646. Movable brake arm 648, as shown, is configured to cause movable brake pad 646 to move toward brake drum 644 and away from brake drum 644 to apply and release the tension to second net roll 610.

In another embodiment, a movable brake arm may be coupled to a brake drum, and the movable brake arm may be configured cause the brake drum to move toward and away from the brake pad to apply and release the tension to a respective net roll.

According to one embodiment, a net wrapper assembly may include a feeding mechanism connected to each brake system and causing a respective brake system to apply the tension and release the tension to a respective net roll. As shown at FIG. 6, net wrapper assembly 600 includes movable feeding arm 650 connected to a feeding mechanism (such as feeding mechanism 1060 shown at FIG. 10) that feeds net from one of the respective first and second net rolls 604, 610. Net wrapper assembly 600 also includes movable link arms 652 and 654 connected to movable feeding arm 650. Movable link arm 652 is connected to the movable feeding arm 650 and brake system 630. Movable link arm 654 is connected to the movable feeding arm 650 and brake system 640.

A movable link arm may be configured to cause both respective brake systems to apply the tension and release the tension to their respective net rolls. It is contemplated, however, that a movable link arm may be configured to cause one of the brake systems to apply the tension and release the tension to one of the respective net rolls independent of the other brake system.

Figure 10:
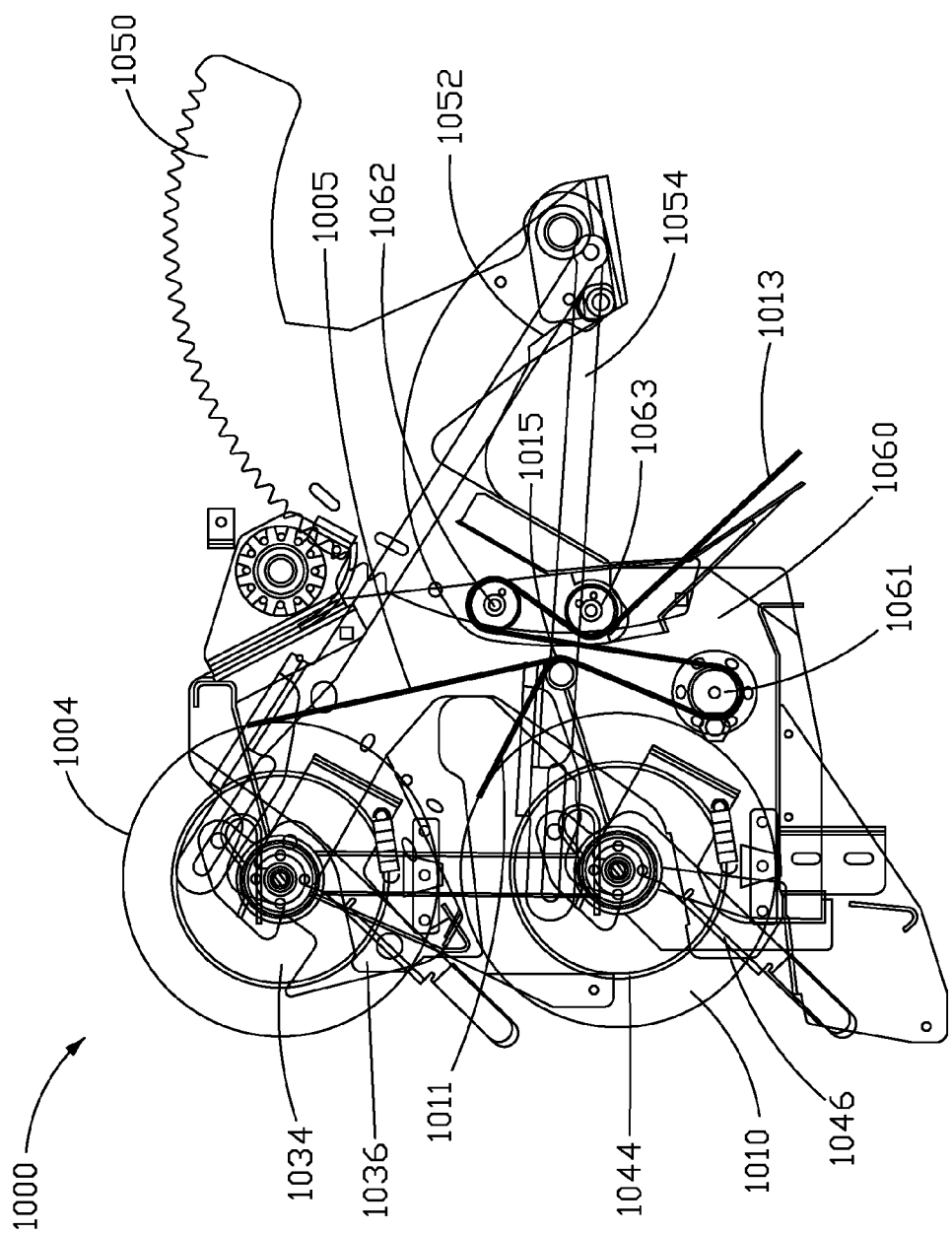
FIG. 10 illustrates a cut away view of an exemplary embodiment of the net wrapper assembly.

FIG. 10 illustrates a cut away view of an exemplary embodiment of the net wrapper assembly. As shown at FIG. 10, net wrapper assembly 1000 includes movable feeding arm 1050 (sometimes referred to as a duckbill assembly) connected to link arms 1052 and 1054. Movable feeding arm 1050 is configured to rotate to a first position prior to net from one of the net rolls 1004 and 1010 being placed on a bale.

According to one embodiment, movable feeding arm 1050 is configured to be at a first position (an insert position) prior to net from one of the net rolls being placed on a bale. When the movable feeding arm 1050 is in the first position, each brake system releases the tension to each respective net roll 1004 and 1010. Movable feeding arm 1050 is configured to be at a second position when net from one of the net rolls is wrapping around a bale. At this second position, each of the brake systems applies the tension to each respective net roll 1004 and 1010. In another embodiment, the brake systems, such as through the brake drums 1034, 1044 and brake arms 1036, 1046, may apply the tension to each respective net roll 1004 and 1010 independently.

In one embodiment, the feeding mechanism may be configured to receive nets from each of the net rolls at a common point in the feeding mechanism. As shown at FIG. 10, path 1005 illustrates a net path where net from net roll 1004 travels along as it is fed through a series of rollers 1061, 1062, 1063 in feeding mechanism 1060. Path 1011 illustrates a net path where net from net roll 1010 travels along as it is fed through feeding mechanism 1060. The nets travel along paths 1005 and 1011 separately until the net paths meet at a common point 1015. After the paths 1005 and 1011 meet at common point 1015, paths 1005 and 1011 travel along a common path 1013 to a wrapping system to be wrapped around a bale. Accordingly, net from either of the net rolls may follow the same path through the feeding mechanism to a wrapping system to be wrapped around a bale.

It is contemplated that various wrapping systems may be used to wrap net around a bale after it exits the feeding system illustrated according to exemplary embodiments shown at FIG. 10. For example, it is contemplated that the wrapping system described in U.S. Pat. No. 6,550,218, which is incorporated for its teaching on wrapping systems, may be used to wrap net around a bale after it exits the feeding system illustrated according to exemplary embodiments shown at FIG. 10.

FIG. 11 is a flow chart illustrating a method for installing net rolls into a net wrapper assembly for activation according to an exemplary embodiment of the invention. The exemplary method will also be described with reference to FIGS. 9A and 9B, illustrating an exemplary embodiment of the invention showing positions of net support tubes and net rolls during different stages of installation. In the exemplary method shown at FIG. 11, the lower roll is installed prior to the upper roll. However, it is contemplated than an upper net roll and a lower net roll may be installed in any order.

As shown in step 1102 at FIG. 11, the method includes pivoting a first net support tube away from the net wrapper assembly at a first net support tube pivoting element. FIG. 9B shows net support tube 903 at an active wrapping position. Although net support tube 903 is shown holding a net roll 904, presumably net support tube 903 will not be holding a net roll at the beginning of the exemplary method. Accordingly, an operator may pivot the net support tube 903 from its active wrapping position at FIG. 9B to its installation position shown at FIG. 9A.

As shown in step 1104 at FIG. 11, the method also includes placing a first net roll onto the first net support tube. For example, an operator may place net roll 910 onto net support tube 903 at the installation position shown at FIG. 9A.

It is contemplated that an operator may use a support arm to support the weight of a net roll. Accordingly, an operator may move a support arm between a first support arm position and a second support arm position prior to installing any of the net rolls. For example, referring to FIGS. 9A and 9B, an operator may move a support arm from the position of support arm 812 (shown at FIG. 8) to the position of support arm 912 shown at FIGS. 9A and 9B. When a support arm is in the position of support arm 812 (shown at FIG. 8), net roll 910 is in its wrapping active position. When a support arm is in the position of support arm 912 (shown at FIGS. 9A and 9B), net roll 910 can be placed on net support tube 903. It is contemplated that an operator may move support arm 912 into the position shown at FIGS. 9A and 9B. It is also contemplated that an operator may move support arm 912 into other positions suitable for installing a net roll onto a net support tube by sliding support arm along support guide arm 922 and/or rotating support arm 912 with rotating element 918.

As shown in step 1106 at FIG. 11, the method includes pivoting the first net support tube and the first net roll back toward the net wrapper assembly and into a first net roll wrapping active position. For example, an operator may pivot net support tube 903 and net roll 910 back toward the net wrapper assembly 900 and into the net roll wrapping active position shown in FIG. 9B.

As shown in step 1108 at FIG. 11, the method includes pivoting a second net support tube away from the net wrapper assembly at a second net support tube pivoting element. For example, an operator may pivot net support tube 902 from its active wrapping position shown at FIG. 9A to its installation position shown at FIG. 9B.

As shown in step 1110 at FIG. 11, the method includes placing a second net roll onto the second net support tube. For example, an operator may place net roll 904 onto net support tube 902 at the installation position shown at FIG. 9B. It may be desirable to position support arm below net support tube 903 (as shown at FIGS. 9A and 9B) so that net roll 910 can be moved horizontally away from the net wrapper assembly 900 and vertically downward toward the support arm 912. This may be advantageous to the operator because the operator does not have to reach as high and the net roll may be placed on net support tube more easily.

As shown in step 1112 at FIG. 11, the method includes pivoting the second net support tube and the second net roll back toward the net wrapper assembly and into a second net roll wrapping active position. For example, an operator may pivot net support tube 902 and net roll 904 back toward the net wrapper assembly 900 and into the wrapping active position (as shown at FIG. 8).

An operator may feed net from both of the net rolls to a common point in the net wrapper assembly. For example, an operator may feed net from both of the net rolls 1004, 1010, shown at FIG. 10, through common point 1015 and rollers 1061, 1062, 1063 in the feeding assembly to a net wrapping assembly, such as the wrapping assembly described in U.S. Pat. No. 6,550,218. In one exemplary embodiment, an operator may feed net from one of the net rolls to a common point in the net wrapper assembly prior to the other net roll being installed and placed in its wrapping active position. In another exemplary embodiment, an operator may feed net from one of the net rolls to a common point in the net wrapper assembly after both net rolls have been installed and placed in its wrapping active position.

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A baler comprising:
   a net wrapper assembly;
   a first net support tube configured for holding a first net roll, the first net support tube comprising:
      a first end connected to the net wrapper assembly at a first net support tube pivoting element on the net wrapper assembly, and
      a second end connected to the net wrapper assembly when the first net roll is in a first wrapping active position within the net wrapper assembly, wherein the first net roll is in a first wrapping active position when the first net roll is in position to have net fed to a net feeding system;
   a second net support tube configured for holding a second net roll, the second net support tube comprising:
      a first end connected to the net wrapper assembly at a second net support tube pivoting element on the net wrapper assembly, and
      a second end connected to the net wrapper assembly when the second net roll is in a second wrapping active position within the net wrapper assembly, wherein the second net roll is in a second wrapping active position when the second net roll is in position to have net fed to the net feeding system;
   a plurality of brake systems wherein each brake system is configured to apply and release tension to a respective one of the first and second net rolls;
      wherein the net feeding system comprises a feeding mechanism that feeds net from one of the respective first and second net rolls; comprising at least two movable arms connected to the respective brake system such that each movable arm is configured to cause at least one of the respective brake systems to apply the tension and release the tension to a respective net roll.

2. The baler of claim 1, further comprising a support arm that supports the weight of the first and second net rolls during installation of the net rolls onto their respective net support tubes, the support arm comprising:
   a top surface where the first and second net rolls lie during installation of the net rolls onto their respective net support tubes, and a first end coupled to the net wrapper assembly, the first end having a support arm rotating element,
wherein the support arm rotating element is configured to rotate the support arm between a first support arm position when at least one of the first and second net rolls are in their respective wrapping active positions and a second support arm position during installation of the first and second net rolls onto their respective net support tubes.

3. The baler of claim 2, wherein at least one of the first and second net support tube pivoting elements are configured to pivot a respective net support tube away from its first wrapping active position.

4. The baler of claim 3, wherein at least one of the first and second net support tube pivoting elements are configured to pivot a respective net support tube horizontally and vertically away from its first wrapping active position.

5. The baler of claim 3, wherein at least one of the first and second net support tube pivoting elements are configured to pivot a respective net support tube away from its first wrapping active position at an angle in the range of about 30 degrees to about 60 degrees.

6. The baler of claim 1, wherein each brake system comprises:
   a brake drum connected to a respective net roll;
   a brake pad in proximity to the brake drum; and
   a movable brake arm coupled to the brake drum or the brake pad,
wherein the movable brake arm is configured to:
   (i) cause the brake pad to move toward the brake drum and away from the brake drum to apply and release the tension to the respective one of the first and second net rolls, or
   (ii) cause the brake drum to move toward the brake pad and away from the brake pad to apply and release the tension to the respective one of the first and second net rolls.

7. A baler comprising:
a net wrapper assembly;
a first net support tube configured for holding a first net roll, the first net support tube comprising:
   a first end connected to the net wrapper assembly at a first net support tube pivoting element on the net wrapper assembly, and
   a second end connected to the net wrapper assembly when the first net roll is in a first wrapping active position within the net wrapper assembly, wherein the first net roll is in a first wrapping active position when the first net roll is in position to have net fed to a net feeding system;
a second net support tube configured for holding a second net roll, the second net support tube comprising:
   a first end connected to the net wrapper assembly at a second net support tube pivoting element on the net wrapper assembly, and
   a second end connected to the net wrapper assembly when the second net roll is in a second wrapping active position within the net wrapper assembly, wherein the second net roll is in a second wrapping active position when the second net roll is in position to have net fed to the net feeding system;
a plurality of brake systems wherein each brake system is configured to apply and release tension to a respective one of the first and second net rolls:
wherein each brake system comprises:
   a brake drum connected to a respective net roll;
   a brake pad in proximity to the brake drum; and
   a movable brake arm coupled to the brake drum or the brake pad,
wherein the movable brake arm is configured to:
   (i) cause the brake pad to move toward the brake drum and away from the brake drum to apply and release the tension to the respective one of the first and second net rolls, or
   (ii) cause the brake drum to move toward the brake pad and away from the brake pad to apply and release the tension to the respective one of the first and second net rolls; and
wherein the net feeding system comprises;
   a feeding mechanism that feeds net from one of the respective first and second net rolls;
   a movable feeding arm connected to the feeding mechanism; and
   a plurality of movable link arms,
wherein each movable link arm is connected to the movable feeding arm and a respective brake system and each movable link arm is configured to cause at least one of the respective brake systems to apply the tension and release the tension to a respective net roll.

8. The baler of claim 7, wherein,
the movable feeding arm is configured to be at a first position prior to net from one of the net rolls being placed on a bale, and each brake system releases the tension to each respective net roll when the movable feeding arm is in the first position, and
the movable feeding arm is configured to be at a second position when net from one of the net rolls is wrapping around a bale, and each of the movable brake pads engages each of the movable drums and applies the tension when the movable feeding arm is in the second position.

9. The baler of claim 7, wherein the feeding mechanism is configured to receive the first and second nets from each of the first and second net rolls at a common point in the feeding mechanism.

10. A net wrapper assembly comprising:
a first net support tube configured for holding a first net roll, the first net support tube comprising:
   a first end connected to the net wrapper assembly at a first net support tube pivoting element on the net wrapper assembly, and
   a second end connected to the net wrapper assembly when the first net roll is in a first wrapping active position within the net wrapper assembly;
a second net support tube configured for holding a second net roll, the second net support tube comprising:
   a first end connected to the net wrapper assembly at a second net support tube pivoting element on the net wrapper assembly, and
   a second end connected to the net wrapper assembly when the second net roll is in a second wrapping active position within the net wrapper assembly; and
a support arm that supports the weight of the first and second net rolls during installation of the net rolls onto their respective net support tubes, the support arm comprising:
   a top surface where the first and second net rolls lie during installation of the net rolls onto their respective net support tubes, and
   a first end coupled to the net wrapper assembly, the first end having a support arm moving element configured to move the support arm between (i) a first support arm position when at least one of the first and second net rolls are in their respective wrapping active positions and (ii) a second support arm position during installation of the first and second net rolls onto their respective net support tubes a second end that in the first support arm position extends above a lower edge of the second net roll when installed on the second net roll support.

11. The net wrapper assembly of claim 10, further comprising a support arm guide bar positioned below the second net support tube and substantially parallel to the second net support tube, wherein the support arm moving element comprises at least one of:

a rotating element configured to rotate the support arm; and a sliding element configured to slide the support arm in a direction substantially parallel to and along the support arm guide bar.

12. The net wrapper assembly of claim 10, wherein the second net support tube is positioned below the first net support tube, the support arm is positioned below the second net support tube and extends in a direction away from the first and second net support tubes during installation of the second net roll, and at least one of the first and second net support tube pivoting elements are configured to pivot a respective net support tube away from its first wrapping active position such that a portion of respective net roll lies on the support arm during installation of the respective net roll.

13. The net wrapper assembly of claim 10, further comprising a plurality of brake systems, each brake system comprising:

a brake drum connected to a respective net roll;

a brake pad in proximity to the brake drum; and a movable brake arm coupled to the brake drum or the brake pad, wherein the movable brake arm is configured to:
  (i) cause the brake pad to move toward the brake drum and away from the brake drum to apply and release the tension to the respective one of the first and second net rolls, or
  (ii) cause the brake drum to move toward the brake pad and away from the brake pad to apply and release the tension to the respective one of the first and second net rolls.

14. The net wrapper assembly of claim 13, further comprising;

a feeding mechanism that feeds net from one of the respective first and second net rolls;

a movable feeding arm connected to the feeding mechanism; and a plurality of movable link arms, wherein each movable link arm is connected to the movable feeding arm, each brake system and each movable link arm is configured to cause a respective brake system to apply the tension and release the tension to a respective net roll.

15. The net wrapper assembly of claim 14, wherein, the movable feeding arm is configured to be at a first position when one of the net rolls is fed through the feeding mechanism, and each brake system applies the tension to each respective net roll when the movable feeding arm is in the first position, and the movable feeding arm is configured to be at a second position when the net support tubes are in a fixed position, and each brake system disengages the tension to each respective net roll when the movable feeding arm is in the second position.

16. The net wrapper assembly of claim 14, wherein the feeding mechanism is configured to receive the first and second nets from each of the first and second net rolls at a common point in the feeding mechanism.

* * * * *